US011943202B1

(12) United States Patent
Pabijanskas et al.

(10) Patent No.: US 11,943,202 B1
(45) Date of Patent: *Mar. 26, 2024

(54) UTILIZATION OF MULTIPLE EXIT INTERNET PROTOCOL ADDRESSES IN A VIRTUAL PRIVATE NETWORK

(71) Applicant: UAB 360 IT, Vilnius (LT)

(72) Inventors: Karolis Pabijanskas, Vilnius (LT); Justinas Tubis, Siauliai (LT)

(73) Assignee: UAB 360 IT, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 17/946,008

(22) Filed: Sep. 15, 2022

(51) Int. Cl.
*H04L 29/06* (2006.01)
*H04L 9/40* (2022.01)
*H04L 12/46* (2006.01)
*H04L 61/4511* (2022.01)
*H04L 67/141* (2022.01)

(52) U.S. Cl.
CPC ...... *H04L 63/0272* (2013.01); *H04L 12/4641* (2013.01); *H04L 61/4511* (2022.05); *H04L 63/0236* (2013.01); *H04L 67/141* (2013.01)

(58) Field of Classification Search
CPC ............. H04L 63/0272; H04L 61/4511; H04L 12/4641; H04L 63/0236; H04L 67/141

USPC .......................................................... 726/13
See application file for complete search history.

(56) References Cited

U.S. PATENT DOCUMENTS

| 10,951,583 | B1* | 3/2021 | Chandrasekhar ....... H04L 67/56 |
| 11,297,038 | B1* | 4/2022 | Kolaitis ............... H04L 63/0414 |
| 2021/0344706 | A1* | 11/2021 | Zhuang ............... H04L 63/0236 |
| 2022/0141191 | A1* | 5/2022 | Mehta ................. H04L 63/0236 726/15 |

* cited by examiner

*Primary Examiner* — Evans Desrosiers
(74) *Attorney, Agent, or Firm* — The Pattani Law Group

(57) ABSTRACT

A method including receiving, at a VPN server from a user device during an established VPN connection between the VPN server and the user device, a data request for the VPN server to retrieve data of interest from a host device; utilizing, by the VPN server during the established VPN connection, a first exit IP address to transmit a query to the host device for retrieving the data of interest; determining, by the VPN server based on transmitting the query, that the first exit IP address is blocked by the host device; and transmitting, by the VPN server during the established VPN connection and based on determining that the first exit IP address is blocked, the data request to a secondary server to enable retransmission of the query to the host device by utilizing a second exit IP address is disclosed. Various other aspects are contemplated.

20 Claims, 7 Drawing Sheets

UTILIZATION OF MULTIPLE EXIT INTERNET PROTOCOL ADDRESSES IN A VIRTUAL PRIVATE NETWORK

FILED OF DISCLOSURE

Aspects of the present disclosure generally relate to a virtual private network (VPN), and more particularly to utilization of multiple exit internet protocol (IP) addresses in a VPN environment.

BACKGROUND

Global Internet users increasingly rely on VPN services to preserve their privacy, to circumvent censorship, and/or to access geo-filtered content. Originally developed as a technology to privately send and receive data across public networks, VPNs are now used broadly as a privacy-preserving technology that allows Internet users to obscure not only the communicated data but also personal information such as, for example, web browsing history from third parties including Internet service providers (ISPs), Spywares, or the like. A VPN service provider may offer a secure private networking environment within a publicly shared, insecure infrastructure through encapsulation and encryption of the data communicated between a VPN client application (or VPN application) installed on a user device and a remote VPN server.

Most VPN providers rely on a tunneling protocol to create the secure private networking environment, which adds a layer of security to protect each IP packet of the communicated data during communication over the Internet. Tunneling may be associated with enclosing an entire IP packet within an outer IP packet to form an encapsulated IP packet, and transporting the enclosed IP packet over the Internet. The outer IP packet may protect contents of the enclosed IP packet from public view by ensuring that the enclosed IP packet is transmitted over the Internet within a virtual tunnel. Such a virtual tunnel may be a point-to-point tunnel established between the user device and the VPN server. The process of enclosing the entire IP packet within the outer IP packet may be referred to as encapsulation. Computers, servers, or other network devices at ends of the virtual tunnel may be referred to as tunnel interfaces and may be capable of encapsulating outgoing IP packets and of unwrapping incoming encapsulated IP packets.

Encryption may be associated with changing the data from being in a transparently readable format to being in an encoded/encrypted, unreadable format with help of an encryption algorithm. Decryption may be associated with changing the data from being in the encoded/encrypted, unreadable format to being in the transparently readable format with help of a decryption algorithm. In an example, encoded/encrypted data may be decoded/decrypted with only a correct decryption key. In a VPN, encryption may render the communicated data unreadable or indecipherable to any third party. At a basic level, when the user launches the installed VPN application and connects to the VPN server, the VPN application may encrypt all contents of the data before transmission over the Internet to the VPN server. Upon receipt, the VPN server may decrypt the encrypted data and forward the decrypted data to an intended target (e.g., via the Internet). Similarly, the VPN server may encrypt all contents of the data before transmission over the Internet to the user device. Upon receipt, the VPN application on the user device may decrypt the encrypted data and provide the decrypted data to the user.

VPNs generally use different types of encryption and decryption algorithms to encrypt and decrypt the communicated data. Symmetric encryption may utilize encryption and decryption algorithms that rely on a single private key for encryption and decryption of data. Symmetric encryption is considered to be relatively speedy. One example of an encryption and decryption algorithm utilized by symmetric encryption may be an AES encryption cipher. Asymmetric encryption, on the other hand, may utilize encryption and decryption algorithms that rely on two separate but mathematically-related keys for encryption and decryption of data. In one example, data encrypted using a public key may be decrypted using a separate but mathematically-related private key. The public key may be publicly available through a directory, while the private key may remain confidential and accessible by only an owner of the private key. Asymmetric encryption may also be referred to as public key cryptography. One example of an encryption and decryption algorithm utilized by asymmetric encryption may be Rivest-Shamir-Adleman (RSA) protocol.

In a VPN, keys for encryption and decryption may be randomly generated strings of bits. Each key may be generated to be unique. A length of an encryption key may be given by a number of the randomly generated string bits, and the longer the length of the encryption key, the better (e.g., stronger) is the encryption.

VPNs may employ user authentication, which may involve verification of credentials required to confirm authenticity/identity of the user. For instance, when a user launches the VPN application to request a VPN connection, the VPN service provider may authenticate the user device prior to providing the user device with access to VPN services. In this way, user authentication may provide a form of access control. Typically, user authentication may include verification of a unique combination of a user ID and password. To provide improved security in the VPN, user authentication may include additional factors such as knowledge, possession, inheritance, or the like. Knowledge factors may include items (e.g., pin numbers) that an authentic user may be expected to know. Possession factors may include items (e.g., one-time password (OTP) tokens) that an authentic user may be expected to possess at a time associated with the authentication. Inherent factors may include biometric items (e.g., fingerprint scans, retina scans, iris scans, or the like) that may be inherent traits of an authentic user.

A VPN may be associated with a network of VPN servers, typically deployed in various geographic locations. A VPN server may be a physical server or a virtual server configured to host and/or globally deliver VPN services to the user. A server may be a combination of hardware and software, and may include logical and physical communication ports. When launched, the VPN application may connect with a selected VPN server for secure communication of data via the virtual tunnel.

The VPN application, installed on the user device, may utilize software-based technology to establish a secure connection between the user device and a VPN server. Some VPN applications may automatically work in the background on the user device while other VPN applications may include front-end interfaces to allow the user to interact with and configure the VPN applications. VPN applications may often be installed on a computer (e.g., user device), though some entities may provide a purpose-built VPN application as a hardware device that is pre-installed with software to enable the VPN. Typically, a VPN application may utilize one or more VPN protocols to encrypt and decrypt the communicated data. Some commonly used VPN protocols may include OpenVPN, Wireguard, and IKEv2.

SUMMARY

In one aspect, the present disclosure contemplates a method including receiving, at a VPN server from a user device during an established VPN connection between the VPN server and the user device, a data request for the VPN server to retrieve data of interest from a host device; utilizing, by the VPN server during the established VPN connection, a first exit IP address to transmit a query to the host device for retrieving the data of interest; determining, by the VPN server based on transmitting the query, that the first exit IP address is blocked by the host device; and transmitting, by the VPN server during the established VPN connection and based on determining that the first exit IP address is blocked, the data request to a secondary server to enable retransmission of the query to the host device by utilizing a second exit IP address, different from the first exit IP address.

In another aspect, the present disclosure contemplates a device associated with a virtual private network (VPN), the device comprising a memory; and a processor communicatively coupled to the memory, the processor being configured to: receive, from a user device during an established VPN connection between the VPN server and the user device, a data request for the VPN server to retrieve data of interest from a host device; utilize, during the established VPN connection, a first exit internet protocol (IP) address to transmit a query to the host device for retrieving the data of interest; determine, based at least in part on transmitting the query, that the first exit IP address is blocked by the host device; and transmit, during the established VPN connection and based at least in part on determining that the first exit IP address is blocked, the data request to a secondary server to enable retransmission of the query to the host device by utilizing a second exit IP address, different from the first exit IP address.

In another aspect, the present disclosure contemplates a non-transitory computer readable medium storing instructions, which when executed by a processor configure the processor to: receive, from a user device during an established VPN connection between the VPN server and the user device, a data request for the VPN server to retrieve data of interest from a host device; utilize, during the established VPN connection, a first exit internet protocol (IP) address to transmit a query to the host device for retrieving the data of interest; determine, based at least in part on transmitting the query, that the first exit IP address is blocked by the host device; and transmit, during the established VPN connection and based at least in part on determining that the first exit IP address is blocked, the data request to a secondary server to enable retransmission of the query to the host device by utilizing a second exit IP address, different from the first exit IP address.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
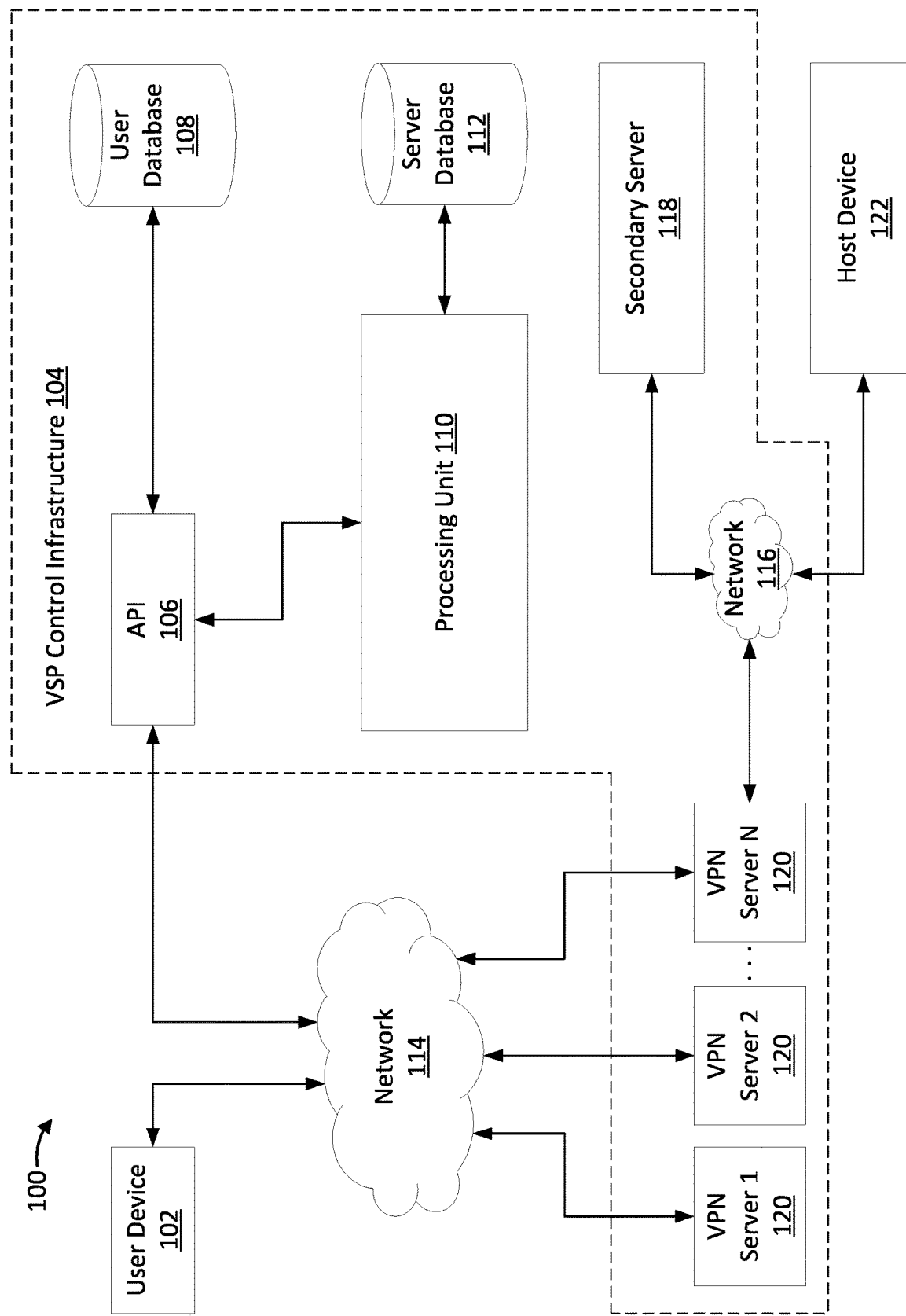

FIG. 1 is an illustration of an example system associated with utilization of multiple exit IP addresses in a VPN, according to various aspects of the present disclosure.

Figure 2:
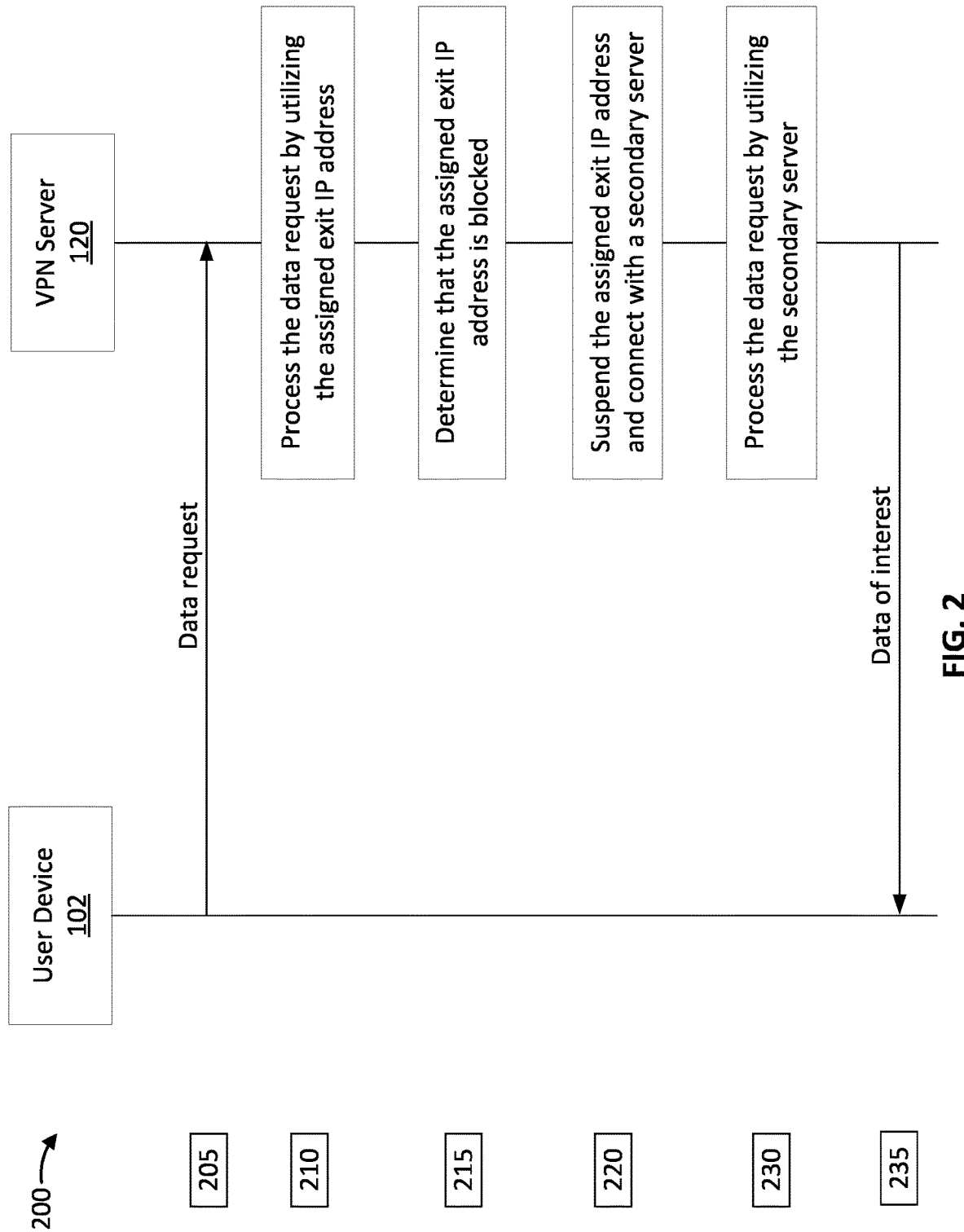

FIG. 2 is an illustration of an example flow associated with utilization of multiple exit IP addresses in a VPN environment, according to various aspects of the present disclosure.

Figure 3:
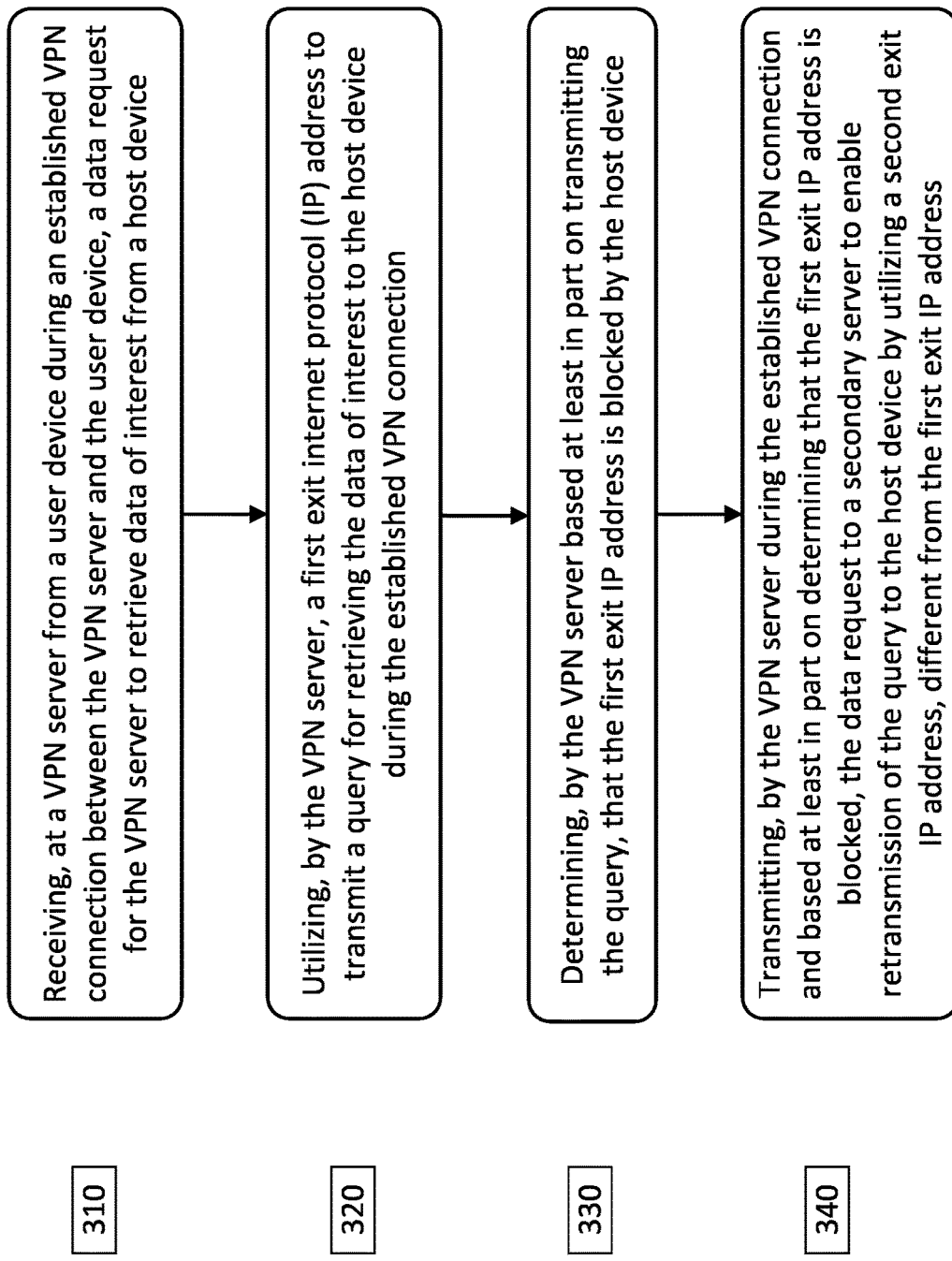

FIG. 3 is an illustration of an example process associated with utilization of multiple exit IP addresses in a VPN environment, according to various aspects of the present disclosure.

Figure 4:
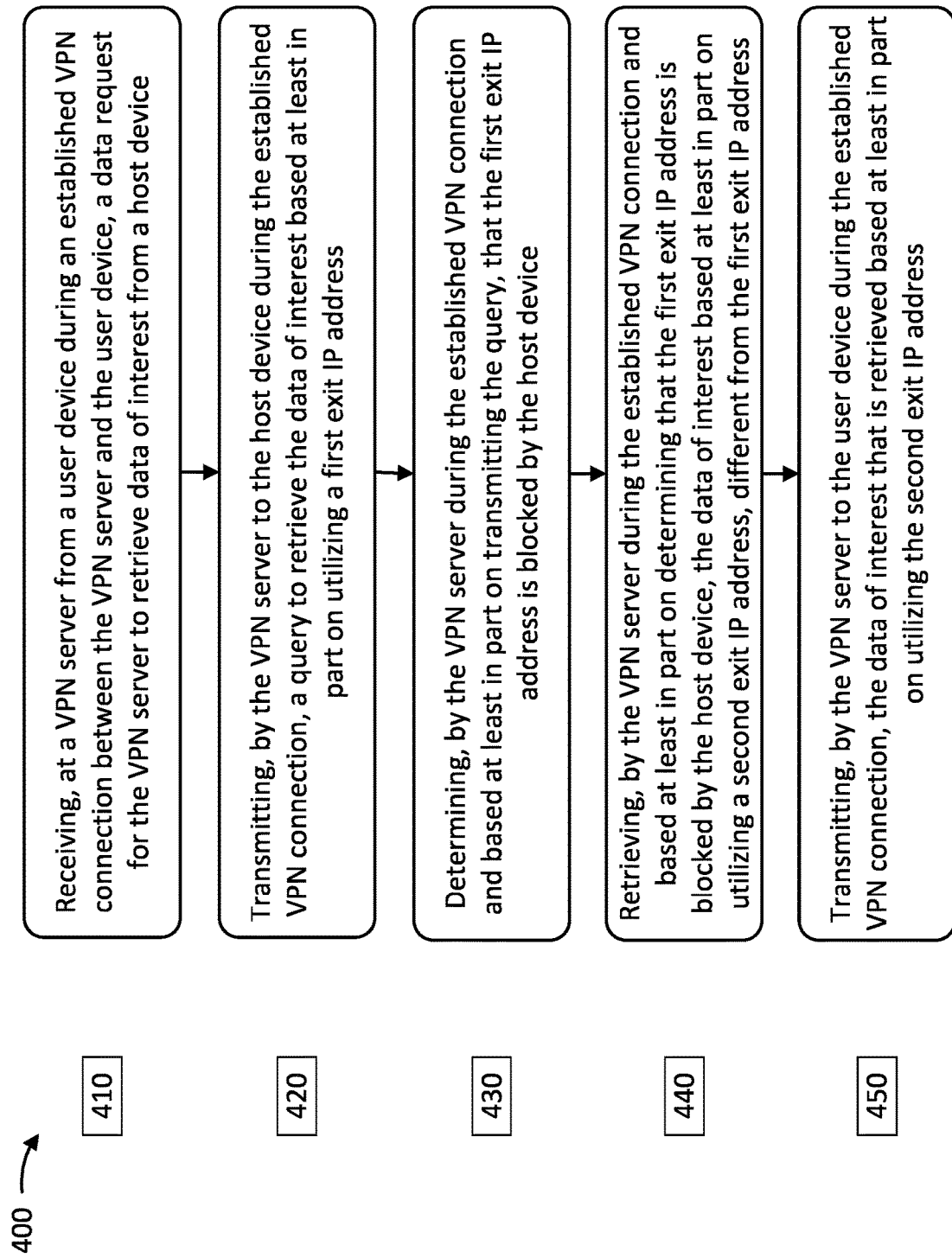

FIG. 4 is an illustration of an example process associated with utilization of multiple exit IP addresses in a VPN environment, according to various aspects of the present disclosure.

Figure 5:
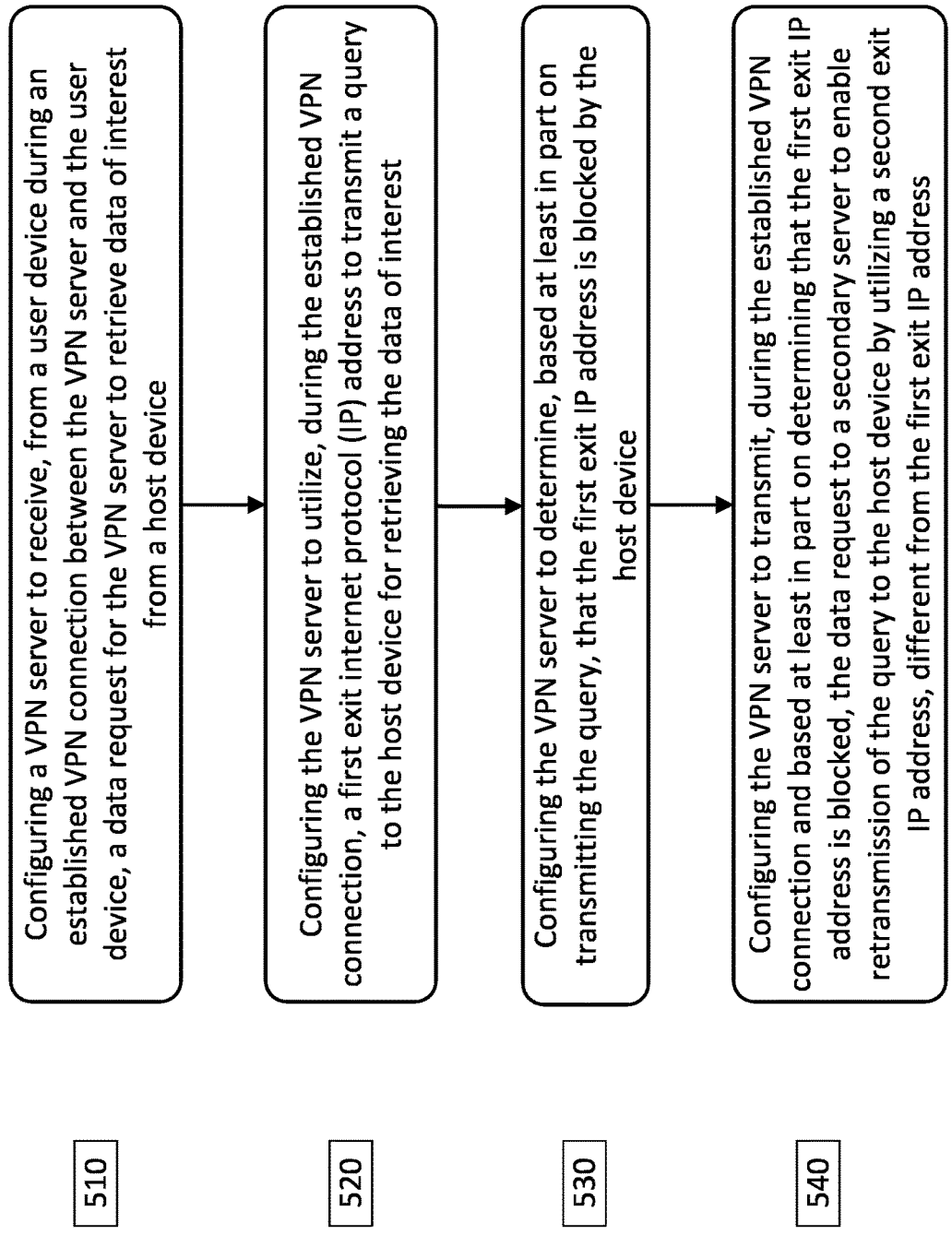

FIG. 5 is an illustration of an example process associated with utilization of multiple exit IP addresses in a VPN environment, according to various aspects of the present disclosure.

Figure 6:
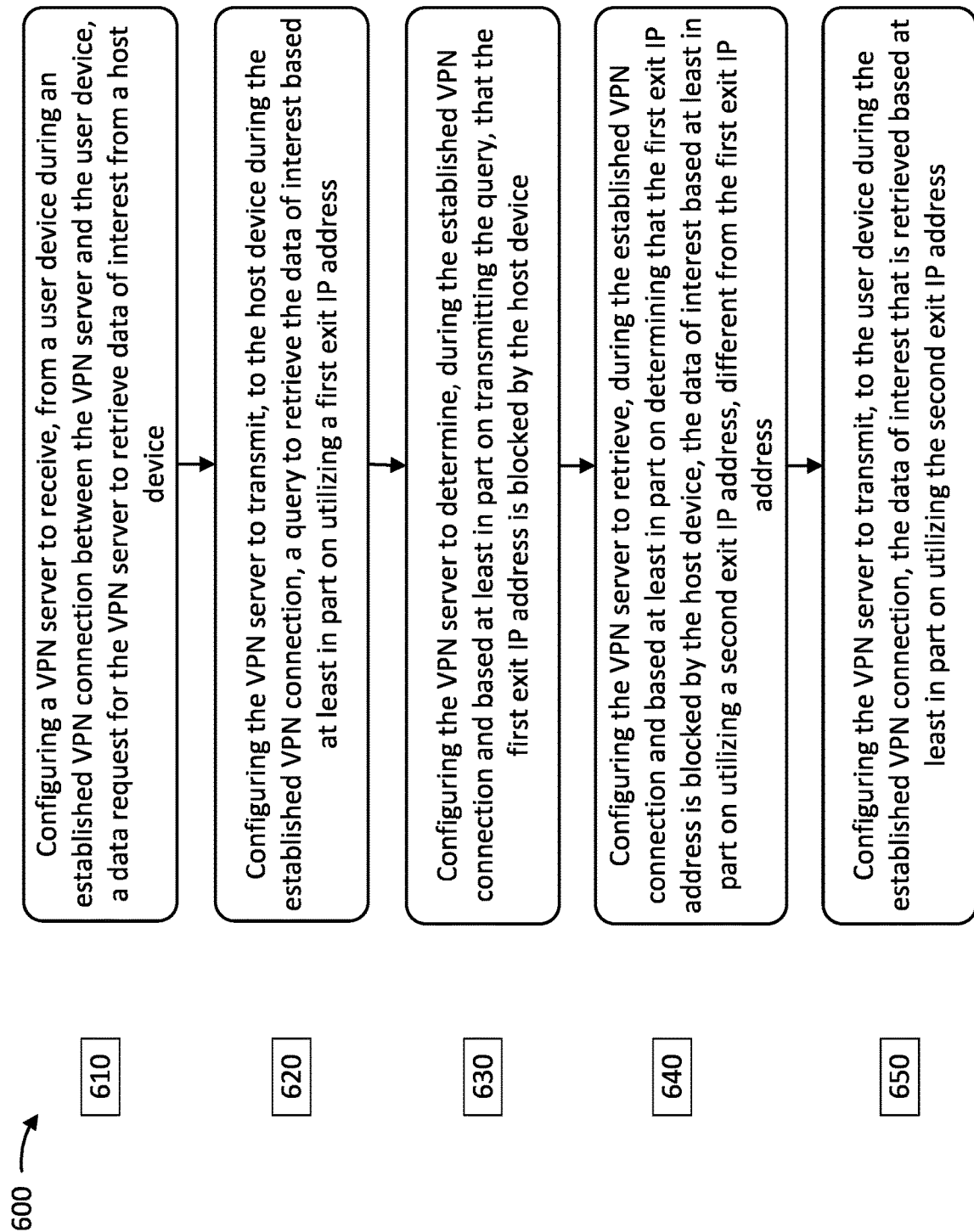

FIG. 6 is an illustration of an example process associated with utilization of multiple exit IP addresses in a VPN environment, according to various aspects of the present disclosure.

Figure 7:
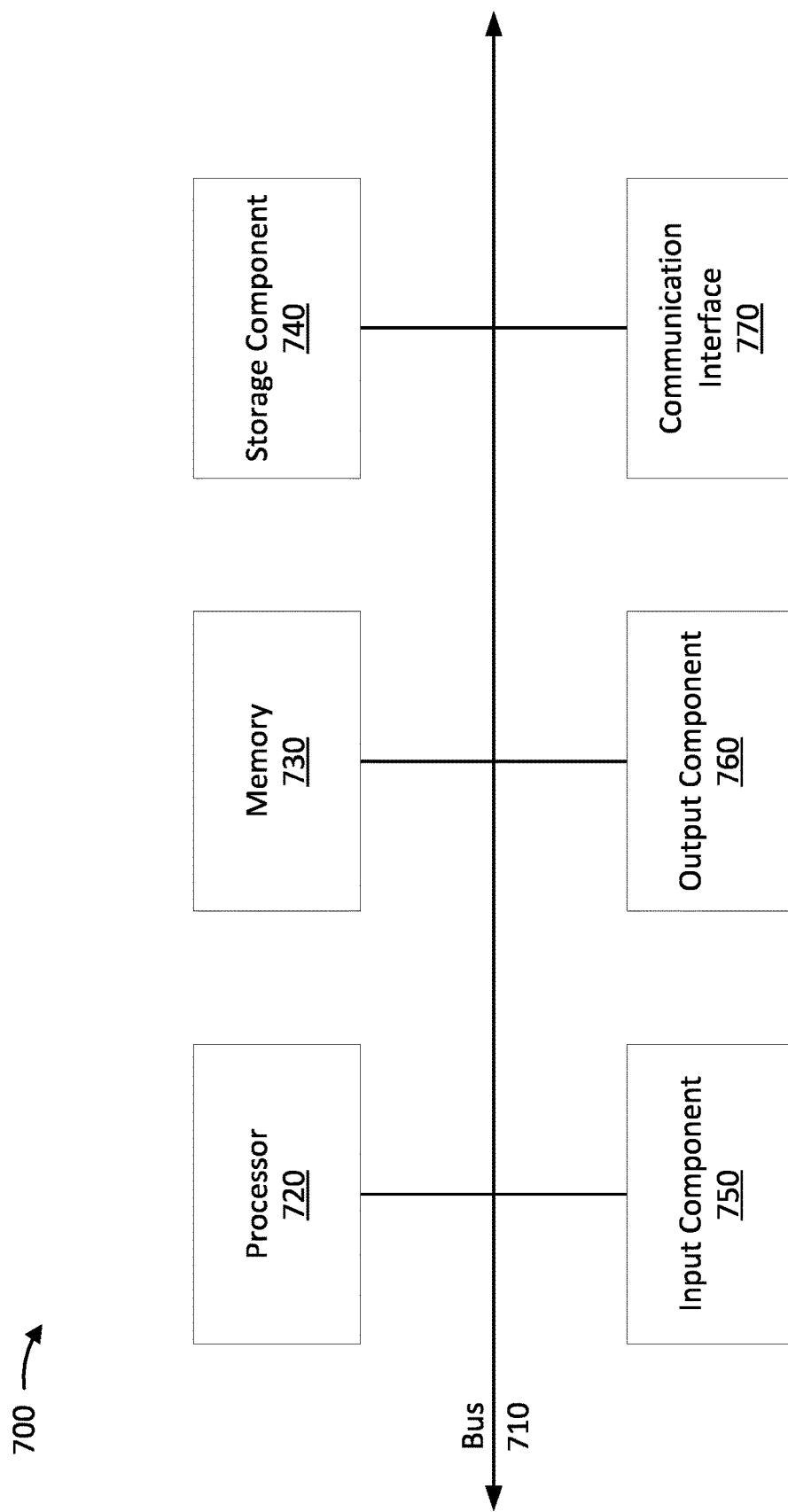

FIG. 7 is an illustration of example devices associated with utilization of multiple exit IP addresses in a VPN environment, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example system 100 associated with utilization of multiple exit IP addresses in a VPN environment, according to various aspects of the present disclosure. Example 100 shows an architectural depiction of components included in system 100. In some aspects, the components may include a user device 102 capable of communicating with a VPN service provider (VSP) control infrastructure 104 and with one or more VPN servers 120 over a network 114. The VSP control infrastructure 104 may be controlled by a VPN service provider and may include an application programming interface (API) 106, a user database 108, processing unit 110, a server database 112, and the one or more VPN servers 120. As shown in FIG. 1, the API 106 may be capable of communicating with the user database 108 and with the processing unit 110. Additionally, the processing unit 110 may be capable of communicating with the server database, which may be capable of communicating with a testing module (not shown). The testing module may be capable of communicating with the one or more VPN servers 120 over the network 114. The processing unit 110 may be capable of configuring and controlling operation of the one or more VPN servers 120. The VPN servers 120 may be configured to communicate with one or more host devices to, for example, request and retrieve data of interest. Further, as shown in FIG. 1, the VPN servers 120 may be configured to communicate with one or more secondary servers 118 or routing of requests for data of interest received from the user device 102. The VPN servers 120 may also be configured to communicate with an authentication server (not shown) over the network. The processing unit 110 may be capable of configuring and controlling operation of the authentication server. In some aspects, the network 116 may be similar to network 114.

The user device 102 may be a physical computing device capable of hosting a VPN application and of connecting to the network 114. The user device 102 may be, for example, a laptop, a mobile phone, a tablet computer, a desktop computer, a smart device, a router, or the like. In some aspects, the user device 102 may include, for example, Internet-of-Things (IoT) devices such as smart home appliances, smart home security systems, autonomous vehicles, smart health monitors, smart factory equipment, wireless inventory trackers, biometric cyber security scanners, or the like.

The network 114 and/or the network 116 may be any digital telecommunication network that permits several nodes to share and access resources. In some aspects, the network 114 and/or the network 116 may include one or more of, for example, a local-area network (LAN), a wide-area network (WAN), a campus-area network (CAN), a metropolitan-area network (MAN), a home-area network (HAN), Internet, Intranet, Extranet, and Internetwork.

The VSP control infrastructure 104 may include a combination of hardware and software components that enable provision of VPN services to the user device 102. The VSP control infrastructure 104 may interface with (the VPN application on) the user device 102 via the API 106, which may include one or more endpoints to a defined request-response message system. In some aspects, the API 106 may be configured to receive, via the network 114, a connection request from the user device 102 to establish a VPN connection with a VPN server 120. The connection request may include an authentication request to authenticate the user device 102 and/or a request for an IP address of an optimal VPN server for establishment of the VPN connection therewith. In some aspects, an optimal VPN server may be a single VPN server 120 or a combination of one or more VPN servers 120. The API 106 may receive the authentication request and the request for an IP address of an optimal VPN server in a single connection request. In some aspects, the API 106 may receive the authentication request and the request for an IP address of an optimal VPN server in separate connection requests.

The API 106 may further be configured to handle the connection request by mediating the authentication request. For instance, the API 106 may receive from the user device 102 credentials including, for example, a unique combination of a user ID and password for purposes of authenticating the user device 102. In another example, the credentials may include a unique validation code known to an authentic user. The API 106 may provide the received credentials to the user database 108 for verification.

The user database 108 may include a structured repository of valid credentials belonging to authentic users. In one example, the structured repository may include one or more tables containing valid unique combinations of user IDs and passwords belonging to authentic users. In another example, the structured repository may include one or more tables containing valid unique validation codes associated with authentic users. The VPN service provider may add, delete, and/or modify such valid unique combinations of user IDs and passwords from the structured repository. Based at least in part on receiving the credentials from the API 106, the user database 108 and a processor (e.g., the processing unit 110 or another local or remote processor) may verify the received credentials by matching the received credentials with the valid credentials stored in the structured repository. In some aspects, the user database 108 and the processor may authenticate the user device 102 when the received credentials match at least one of the valid credentials. In this case, the VPN service provider may enable the user device 102 to obtain VPN services. When the received credentials fail to match at least one of the valid credentials, the user database 108 and the processor may fail to authenticate the user device 102. In this case, the VPN service provider may decline to provide VPN services to the user device 102.

When the user device 102 is authenticated, the user device 102 may initiate a VPN connection and may transmit to the API 106 a request for an IP address of an optimal VPN server. The processing unit 110 included in the VSP control infrastructure may be configured to determine/identify a single VPN server 120 as the optimal server or a list of VPN servers. The processing unit 110 may utilize the API 106 to transmit the IP address of the optimal VPN server. In some implementations the processing unit 110 may be configured to determine/identify or a list of VPN servers. The processing unit 110 may utilize the API 106 to transmit the IP address of the optimal VPN server or IP addresses of the VPN servers 120 is provided, the user device 102 may have an option to select a single VPN server 120 from among the listed VPN servers as the optimal VPN server.

In some aspects, the processing unit 110 may be a logical unit including a scoring engine. The processing unit 110 may include a logical component configured to perform complex operations to compute numerical weights related to various factors associated with the VPN servers 120. The scoring engine may likewise include a logical component configured to perform arithmetical and logical operations to compute a server penalty score for one or more of the VPN servers 120. In some aspects, based at least in part on server penalty scores calculated utilizing the complex operations and/or the arithmetical and logical operations, the processing unit 110 may determine an optimal VPN server. In one example, the processing unit 110 may determine the VPN server 120 with the lowest server penalty score as the optimal VPN server. In another example, the processing unit 110 may determine the list of optimal VPN servers by including, for example, three (or any other number) VPN servers 120 with the three lowest server penalty scores.

The user device 102 may transmit to the optimal VPN server an initiation request to establish a VPN connection (e.g., an encrypted tunnel) with the optimal VPN server. The optimal VPN server with which the user device establishes the encrypted tunnel may be referred to as a primary VPN server or an entry VPN server. Based at least in part on receiving the initiation request, the optimal VPN server may conduct a VPN authentication with the authentication server to authenticate the user device 102 as a device that may receive the VPN services from the optimal VPN server. When the VPN authentication is successful, the optimal VPN server may proceed to provide the VPN services to the user device 102. Alternatively, when the VPN authentication fails, the optimal VPN server may refrain from providing the VPN services to the user device 102 and/or may communicate with the user device 102 to obtain additional information to authenticate the user device 102.

In some aspects, a VPN server 120 may include a piece of physical or virtual computer hardware and/or software capable of securely communicating with (the VPN application on) the user device 102 for provision of VPN services. Similarly, the authentication server may include a piece of physical or virtual computer hardware and/or software capable of securely communicating with one or more VPN servers 120 for provision of authentication services.

The one or more host devices 122 may include a type of server that hosts or houses websites and/or related data, applications, and/or services. The one or more host devices 122 may be a remotely accessible Internet server with complete Web server functionality and resources. In some aspects, the one or more host devices 122 may be referred to as a Web hosting server.

In some aspects, the one or more secondary servers 118 may include one or more VPN servers 120. In some aspects, the one or more secondary servers 118 may include one or more servers configured and/or programmed with available exit IP addresses. The one or more secondary servers may include a processor communicatively coupled with, among other things, a volatile memory, a non-volatile memory, and a communication interface to enable a network connection. Further, the one or more secondary servers 118 may be configured and/or programmed to enable secure connections involving encryption and decryption of data.

One or more components (e.g., API 106, user database 108, processing unit 110, server database 112, secondary server 118, and/or VPN server 120) included in the VSP control infrastructure 104 and/or components (e.g., processing unit, memory, communication interface, etc.) included in the user device 102 may further be associated with a controller/processor, a memory, a communication interface, or a combination thereof (e.g., FIG. 7). For instance, the one or more components may include or may be included in a controller/processor, a memory, or a combination thereof. In some aspects, the one or more components may be separate and distinct from each other. Alternatively, in some aspects, one or more components may be combined with another one of the one or more components. In some aspects, the one or more components may be local with respect to each other. Alternatively, in some aspects, the one or more components may be located remotely with respect to another one of the one or more components. Additionally, or alternatively, the one or more components may be implemented at least in part as software stored in a memory. For example, a component (or a portion of a component) may be implemented as instructions or code stored in a non-transitory computer-readable medium and executable by a hardware controller or a hardware processor to perform the functions or operations of the component. Additionally, or alternatively, the one or more components may be configured to perform one or more functions described as being performed by another one of the one or more components.

As indicated above, FIG. 1 is provided as an example. Other examples may differ from what is described with regard to FIG. 1.

A user device may seek to obtain VPN services from a VSP control infrastructure. Based at least in part on authentication of the user device, the VSP control infrastructure may select a VPN server to provide the VPN services to the user device. In an example, the VSP control infrastructure may provide the user device with an entry IP address associated with the VPN server. The user device may utilize the entry IP address to communicate and establish a VPN connection (e.g., encrypted tunnel) with the VPN server. Based at least in part on the VPN connection being established, the VSP control infrastructure and/or the VPN server may assign an exit IP address to the user device.

During the established VPN connection (e.g., while the given VPN connection remains established), the VPN server may utilize the entry IP address and the assigned exit IP address to process requests received from the user device. For instance, during the established VPN connection, the VPN server may utilize the entry IP address to receive a request from the user device for retrieving data of interest from a host device and may utilize the exit IP address to retrieve the data of interest from the host device. Utilizing the exit IP address may include the VPN server utilizing the exit IP address to communicate (e.g., transmit and/or receive communications) with the host device to retrieve the data of interest. Further, the VPN server may utilize a correlation between the exit IP address and the entry IP address to transmit the retrieved data of interest to the user device.

In some cases, the host device may examine the exit IP address and determine that the exit IP address is an IP address associated with a commercial entity (e.g., the VPN server). For instance, the host device may determine that the exit IP address is an IP address assigned for commercial use by the commercial entity. In an example, the host device may determine that the exit IP address is being utilized to mask information (e.g., an identity) regarding the user device, thereby purposefully hiding such information from the host device. As a result, the host device may decline to provide the data of interest requested via utilization of the exit IP address. Further, the host device may temporarily or permanently discard all communication received via utilization of the exit IP address. In this case, the VPN server may be unable to retrieve data of interest from the host device for any user device.

To receive the data of interest from the host device, the user device may terminate the established VPN connection with the VPN server and establish a new VPN connection with a new VPN server. The new VPN server may utilize a new exit IP address to again request the data of interest from the host device. Terminating the established VPN connection, establishing the new VPN connection with the new VPN server, and again requesting the data of interest utilizing the new exit IP address may inefficiently consume user device resources (e.g., processing resources, memory resources, power consumption resources, battery life, or the like) and VPN resources (computational resources, network bandwidth, management resources, processing resources, memory resources, or the like) that may otherwise be used to perform suitable tasks associated with the VPN.

Various aspects of systems and techniques discussed in the present disclosure enable utilization of multiple exit IP addresses in a VPN. In some aspects, a user device may establish a VPN connection (e.g., encrypted tunnel) with a primary VPN server configured by a VSP control infrastructure to provide VPN services to the user device. During the established VPN connection, the techniques discussed herein may enable the primary VPN server (and/or an associated VSP control infrastructure) to assign, to the user device, an exit IP address that may be used to process a data request received from the user device for data of interest. Further, during the established VPN connection, when the primary VPN server determines that the assigned exit IP address is blocked, the techniques may enable the primary VPN server to assign and utilize a new exit IP address to process the data request. In an example, based at least in part on determining that the assigned exit IP address is blocked, the primary VPN server may utilize the new exit IP address to request and receive the data of interest from a host device. In some aspects, the new exit IP address may be associated with a secondary server such as, for example, a different VPN server and/or a relay server. In this case, the primary VPN server may establish a secure connection with the secondary server, and route the data request for the data of interest to the host device via the secondary server. The secondary server may utilize the new exit IP address to retrieve the data of interest from the host device and transmit the retrieved data of interest to the primary VPN server, which, in turn, may transmit the received data of interest to the user device. In some aspects, the secondary server may utilize another secondary server to retrieve the data of interest in a similar and/or analogous manner as the primary VPN server. In this case, the secondary server may establish another secure connection with the other secondary server, and route the data request for the data of interest to the host device via the other secondary server. The other secondary server may utilize another new exit IP address to retrieve the data of interest from the host device and transmit the retrieved data of interest to the secondary server, which, in turn, may transmit the received data of interest to the primary VPN server. As such, the primary VPN server may utilize multiple exit IP addresses during the established VPN connection to provide the data of interest to the user device. In this way, the VSP control infrastructure and/or the primary VPN server may enable the user device to receive the data of interest without, among other things, terminating the established VPN connection, establishing the new VPN connection with the new VPN server, and requesting the data interest utilizing the new exit IP address associated with the new VPN server. As a result, the VSP control infrastructure and/or the primary VPN server may enable efficient utilization of user device resources (e.g., processing resources, memory resources, power consumption resources, battery life, or the like) and VPN resources (computational resources, network bandwidth, management resources, processing resources, memory resources, or the like) for performing suitable tasks associated with the VPN.

In some aspects, a processor (e.g., processor 720) associated with the VPN server may receive, from a user device during an established VPN connection between the VPN server and the user device, a data request for the VPN server to retrieve data of interest from a host device; utilize, during the established VPN connection, a first exit internet protocol (IP) address to transmit a query to the host device for retrieving the data of interest; determine, based at least in part on transmitting the query, that the first exit IP address is blocked by the host device; and transmit, during the established VPN connection and based at least in part on determining that the first exit IP address is blocked, the data request to a secondary server to enable retransmission of the query to the host device by utilizing a second exit IP address, different from the first exit IP address. In some aspects, the VPN server may proactively, and prior to receiving a data request from the user device, utilize the first exit IP address to transmit periodic queries to determine whether the host device has blocked the first exit IP address. When the VPN server determines that the host device has blocked the first exit IP address, the VPN server may determine that a second exit IP address available to the VPN server or a secondary server utilizing a second exit IP address, different from the first exit IP address, is to be utilized to retrieve data of interest from the host device.

Utilizing an exit IP address by a server (e.g., primary VPN server, secondary server, etc.) may be associated with the server selecting and/or assigning the exit IP address to a user device during an established VPN connection between the user device and the primary VPN server. The exit IP address may be selected from a pool of exit IP addresses available to the server. In some aspects, a first exit IP address may be assigned to a user device to be utilized by the primary VPN server to process a data request. Based at least in part on determining that the first exit IP address is blocked, the server may utilize a new, second exit IP address to process the data request. In some aspects, processing a data request may involve requesting and retrieving, from a host device, data of interest associated with or requested via the data request. In some aspects, the second exit IP address may be associated with a secondary server. In some aspects, the secondary server may utilize another secondary server to retrieve the data of interest in a similar and/or analogous manner as the primary VPN server. In this case, the secondary server may establish another secure connection with the other secondary server, and route the data request for the data of interest to the host device via the other secondary server. The other secondary server may utilize another new exit IP address to retrieve the data of interest from the host device and transmit the retrieved data of interest to the secondary server, which, in turn, may transmit the received data of interest to the primary VPN server.

FIG. 2 is an illustration of an example flow 200 associated with utilization of multiple exit IP addresses in a VPN, according to various aspects of the present disclosure. Example flow 200 includes a user device 102 in communication with a VPN server 120. In some aspects, the user device 102 may communicate with the VPN server 120 over a network (e.g., network 114). In some aspects, the VPN server 120 may be a primary VPN server.

The user device 102 may be in communication with the VPN server 120 based at least in part on utilizing an entry IP address to establish a VPN connection with the VPN server 120. In some aspects, the established VPN connection may use a VPN protocol such as, for example, Wireguard, IKEv2, OpenVPN, or the like. Based at least in part on the VPN connection being established, the VPN server 120 may assign an exit IP address (e.g., first exit IP address) to the user device 102. In some aspects, the exit IP address may be selected from among a plurality of exit IP addresses included in a pool of exit IP addresses available to the VPN server 120.

In some aspects, the exit IP address may be randomly selected or sequentially selected from among the plurality of exit IP addresses included in the pool of exit IP addresses. Randomly selecting or sequentially selecting an exit IP address may include selecting an exit IP address according to, for example, an inverse sequential order, a random sequential (random but higher) order, a random inverse (random but lower) order, a random non-sequential (random but not next) order, a two-step (random and then next) order, a random including current exit IP address order, a sequential discreet (at least n+2 steps, with n being an integer), and/or a random lower bound (random but only within a upper half, upper quartile, etc.) order.

In some aspects, the VPN server 120 may utilize an nftable network filter to assign exit IP addresses. In some aspects, the VSP control infrastructure 104 (e.g., processing unit 110) may program the nftables with respect to assigning of exit IP addresses. For instance, the VSP control infrastructure 104 may configure the VPN server to select and/or assign exit IP addresses randomly or to select and/or assign exit IP addresses sequentially. Based at least in part on assigning the exit IP address to the user device 102, the VPN server 120 may store a correlation between the entry IP address and the exit IP address (that is assigned to the user device 102) in a connection tracking table.

During the established VPN connection, the VPN server 120 may receive a plurality of data requests from the user device 102. For instance, as shown by reference numeral 205, the user device 102 may utilize the entry IP address to transmit a data request to the VPN server 120. In some aspects, the data request may include a request for the VPN server 120 to retrieve and provide data of interest to the user device 102. In an example, the user device may transmit the data request by utilizing a client application configured and provided by the VSP control infrastructure or a browser installed on the user device 102. The data request may be associated with initiating a connection with a website on the Internet, and may request the VPN server 120 to retrieve and provide data of interest from a host device (e.g., host device 122) that is hosting the website.

Based at least in part on receiving the data request, as shown by reference numeral 210, the VPN server 120 may process the data request by utilizing the assigned exit IP address. To process the data request, the VPN server 120 may open a first communication socket between the VPN server 120 and the host device on the open Internet. Further, the VPN server 120 may utilize the assigned exit IP address to transmit a query to the host device for the purpose of retrieving the data of interest.

As shown by reference numeral 215, the VPN server 120 may determine that the assigned exit IP address is blocked by the host device. In an example, based at least in part on transmitting the query to the host device, the VPN server 120 may receive a response from the host device indicating that the host device declines to provide the data of interest due to the assigned exit IP address being associated with commercial use by the VPN server. In another example, based at least in part on transmitting the query to the host device, the VPN server 120 may receive a response from the host device indicating that the host device has blacklisted the assigned exit IP address such that communications transmitted utilizing the assigned exit IP address are discarded by the host device. In yet another example, the VPN server 120 may fail to receive any response from the host device, indicating that the host device has discarded the query from the VPN server.

In yet another example, based at least in part on transmitting the query to the host device, the VPN server 120 may receive a response from the host device indicating that only a portion of the data of interest may be received utilizing the assigned exit IP address. As a result, the VPN server 120 may determine that the assigned exit IP address is blocked such that the data of interest may not be retrieved from the host device by utilizing the assigned exit IP address. In this case, the VPN server 120 may determine and store, in a local memory, a negative correlation between the assigned exit IP address and the host device to indicate that the assigned exit IP address is not to be utilized for retrieving at least part of the requested information from the host device.

As shown by reference numeral 220, based at least in part on determining that the assigned exit IP address is blocked by the host device, the VPN server 120 may automatically, and in real time, suspend utilization of the assigned exit IP address and determine that a new exit IP address is to be utilized to retrieve the data of interest from the host device. In some aspects, the VPN server 120 may suspend utilization of the assigned exit IP address with respect to only the host device. In other words, the VPN server may continue to utilize the assigned exit IP address to retrieve data of interest for the user device 102 (or for another user device) from another host device. In some aspects, the VPN server 120 and/or the VSP control infrastructure may store information regarding suspended utilization of the assigned exit IP address in a memory (e.g., server database 112).

Further, during suspension of utilization of the assigned exit IP address, the VPN server 120 may periodically (e.g., every 30 seconds, every 60 seconds, every 3 minutes, every numeral five minutes, every 10 minutes, every 30 minutes, every 60 minutes, etc.) transmit a query to the host device to determine whether the host device has ceased to block the assigned exit IP address. In an example, when the VPN server 120 receives an expected reply from the host device in response to a transmitted query, the VPN server 120 may determine that the host device has ceased to block the assigned exit IP address. In this case, the VPN server 120 may end suspension of utilization of the assigned exit IP address. In other words, the VPN server 120 may utilize the assigned exit IP address to retrieve data of interest for the user device 102 from the host device. In this case, the VPN server 120 may discard from the associated memory the negative correlation between the exit IP address and the host device. In some aspects, the VPN server 120 may proactively, and prior to receiving a data request from the user device 102, utilize the assigned exit IP address to transmit periodic queries to determine whether the host device has blocked the assigned exit IP address. When the VPN server 120 determines that the host device has blocked the assigned exit IP address, the VPN server 120 may determine that secondary server utilizing second exit IP address, different from the assigned exit IP address, is to be utilized to retrieve data of interest from the host device.

During suspension of utilization of the assigned exit IP address, the VPN server 120 may utilize one or more new exit IP address (e.g., one at a time) to retrieve the data of interest from the host device. In some aspects, during the established VPN connection between the VPN server 120 and the user device 102, the VPN server 120 may communicate with a secondary server 118 to establish a connection between the VPN server 120 and the secondary server 118. To enable the VPN server 120 to communicate with the secondary server 118, the VSP control infrastructure may configure the VPN server 120 with communication information associated with the secondary server 118. Alternatively, based at least in part on determining that the assigned exit IP address is blocked, the VPN server 120 may transmit to the VSP control infrastructure a request to receive the communication information associated with a secondary server 118. The VPN server 120 may utilize the communication information to initiate communication with the secondary server 118.

In some aspects, the secondary server 118 may be another VPN server and/or a relay server configured and maintained by the VSP control infrastructure. Further, the VSP control infrastructure may select the secondary server 118 to be utilized by the VPN server 120 to retrieve the data of interest from the host device based at least in part on the secondary server 118 being optimal for retrieving the data of interest. In an example, the secondary server 118 may be optimal because the secondary server 118 may be reserved for the purpose of retrieving data of interest by the VPN server 120. In another example, the secondary server 118 may be optimal because the secondary server 118 may be located geographically/physically closer (and therefore able to provide speedier service) to the user device 102 and/or the VPN server 120. In yet another example, the secondary server 118 may be optimal because the secondary server 118 may currently have a highest available bandwidth to retrieve the data of interest. In yet another example, the secondary server 118 may be optimal because the secondary server 118 may be located geographically/physically closer to an international Internet exchange hub (and therefore able to provide speedier service).

In some aspects the connection between the VPN server 120 and the secondary server 118 may include a secure connection (e.g., encrypted tunnel) such that data communicated between the VPN server 120 and the secondary server 118 may be encrypted and/or decrypted based at least in part on utilizing a negotiated cryptographic key. The cryptographic key may be a symmetric key determined based at least in part on combination of a public key associated with the VPN server 120, a public key associated with the secondary server 118, and/or a randomly generated value.

Based at least in part on establishing a connection with the secondary server 118, the VPN server 120 may modify a configuration file and/or a configuration database related to a domain name system (DNS) server included in and/or associated with the VPN server 120. In some aspects, the modification to the configuration file and/or the configuration database may include an association between the host device that blocked the assigned exit IP address and the secondary server 118. In an example, the VPN server 120 may modify the configuration file and/or the configuration database such that, when the VPN server 120 receives a data request for retrieving data of interest from the host device that blocked the assigned exit IP address, the DNS server returns the communication information (e.g., IP address) associated with the secondary server 118 rather than communication information associated with the host device. As a result, when the VPN server 120 receives a data request for retrieving data of interest from the host device that blocked the assigned exit IP address, the data request may be automatically, and in real time, encrypted and transmitted to the secondary server 118 via the secure connection between the VPN server 120 and the secondary server 118.

As shown by reference numeral 230, the VPN server 120 may again process the data request by transmitting, during the established VPN connection between the VPN server 120 and the user device 102, an encrypted message to the secondary server 118 via the secure connection. The encrypted message may include the data request identifying the data of interest to be retrieved and/or the communication information associated with the host device indicating that the data of interest is to be retrieved from the host device. In some aspects, the encrypted message may include an unsecure IP packet. In this case, the VPN server 120 may include the communication information in a request line included in the unsecure IP packet. The data request may be included in a payload of the unsecure IP packet. In some aspects, the message may include a secure IP packet. In this case, the VPN server 120 may configure the secure IP packet to include a server name indication (SNI) header, and may include the communication information within the SNI header. The data request may be included in a payload of the secure IP packet.

Based at least in part on receiving the encrypted message, the secondary server 118 may decrypt the encrypted message to determine the IP packet. In some aspects, the secondary server 118 may analyze the payload of the IP packet to determine the data request identifying the data of interest. In some aspects, the secondary server 118 may determine whether the message includes the unsecure IP packet or a secure IP packet. When the secondary server 118 determines that the message includes an unsecure IP packet, the secondary server 118 may analyze the request line to determine the communication information associated with the host device. Alternatively, when the secondary server 118 determines that the message includes a secure IP packet, the secondary server 118 may analyze the SNI header to determine the communication information associated with the host device.

Further, the secondary server 118 may assign one or more (e.g., one at a time) new exit IP addresses (e.g., second exit IP address) for retrieving the data of interest from the host device. The new exit IP address may be selected from a pool of exit IP addresses available to the secondary server 118. In some aspects, the secondary server 118 may randomly or sequentially select the new exit IP address from the pool of exit IP addresses, in a similar and/or analogous manner as discussed elsewhere herein.

Based at least in part on determining the data of interest and/or the communication information associated with the host device and/or the new exit IP address, the secondary server 118 may utilize the new exit IP address to transmit a query to the host device for the purpose of retrieving the data of interest. Because the new exit IP address associated with the secondary server 118 may not be blocked by the host device, the host device may provide the data of interest to the secondary server 118. Based at least in part on receiving the data of interest from the host device, the secondary server 118 may transmit the data of interest to the VPN server 120. In some aspects, the secondary server 118 may encrypt the data of interest prior to transmitting the data of interest to the VPN server 120 via the secure connection between the VPN server 120 and the secondary server 118. In some aspects, in association with the data of interest, the secondary server 118 may transmit information identifying the new exit IP address utilized to retrieve the data of interest from the host device.

Based at least in part on receiving the information identifying the new exit IP address, the VPN server 120 may add a positive correlation between the new exit IP address and the host device to indicate that the new exit IP address, associated with the secondary server 118, may be utilized and/or is available to be utilized to retrieve information (e.g., data of interest, etc.) from the host device. Additionally, the VPN server 120 may add a correlation between the new exit IP address associated with the secondary server 118 and the entry IP address utilized by the user device 102 to transmit the data request. In some aspects, the correlation between the entry IP address and the new exit IP address may be privately or internally stored within the VPN server 120 in, for example, the connection tracking table. Based at least in part on the receiving the data of interest, the VPN server 120 may inspect the connection tracking table to determine the routing of the received data of interest. In this case, the correlation between the entry IP address and the new exit IP address may indicate that the data of interest, that was retrieved by utilizing the new exit IP address, is to be routed to the user device 102, which transmitted the data request utilizing the entry IP address of the VPN server 120. Further, based at least in part on a correlation between the entry IP address and the new exit IP address, as shown by reference numeral 235, the VPN server 120 may transmit the received data of interest to the user device 102.

In some aspects, the VPN server 120 may receive a second data request from the user device 102 during the established VPN connection. When the second data request is associated with retrieving data of interest from the host device, and utilization of the assigned exit IP address is suspended, the VPN server 120 may again utilize the new exit IP address associated with the secondary server 118 to retrieve the data of interest from the host device, as discussed above. Alternatively, when the second data request is associated with retrieving data of interest from another host device, the VPN server 120 may utilize the assigned exit IP address to retrieve the data of interest from the other host device.

In this way, by utilizing the new exit IP address when utilization of the assigned exit IP address is suspended, the VSP control infrastructure and/or the VPN server may enable the user device to receive the data of interest without, among other things, terminating the established VPN connection, establishing the new VPN connection with the new VPN server, and requesting the data interest utilizing the new exit IP address associated with the new VPN server. As a result, the VSP control infrastructure and/or the VPN server may enable efficient utilization of user device resources (e.g., processing resources, memory resources, power consumption resources, battery life, or the like) and VPN resources (computational resources, network bandwidth, management resources, processing resources, memory resources, or the like) for performing suitable tasks associated with the VPN.

As indicated above, FIG. 2 is provided as an example. Other examples may differ from what is described with regard to FIG. 2.

FIG. 3 is an illustration of an example process 300 associated with utilization of multiple exit IP addresses in a VPN environment, according to various aspects of the present disclosure. In some aspects, the process 300 may be performed by an associated memory (e.g., memory 730) and/or an associated processor (e.g., processor 720) related to a VPN server (e.g., VPN server 120) configured by an associated VSP control infrastructure. As shown by reference numeral 310, process 300 includes receiving, at a VPN server from a user device during an established VPN connection between the VPN server and the user device, a data request for the VPN server to retrieve data of interest from a host device. For instance, the VPN server may utilize an associated communication interface (e.g., communication interface 770) along with the associated memory and/or processor to receive, at a VPN server from a user device during an established VPN connection between the VPN server and the user device, a data request for the VPN server to retrieve data of interest from a host device, as discussed elsewhere herein.

As shown by reference numeral 320, process 300 includes utilizing, by the VPN server, a first exit internet protocol (IP) address to transmit a query for retrieving the data of interest to the host device during the established VPN connection. For instance, the VPN server may utilize the associated memory and/or processor to utilize a first exit internet protocol (IP) address to transmit a query for retrieving the data of interest to the host device during the established VPN connection, as discussed elsewhere herein.

As shown by reference numeral 330, process 300 includes determining, by the VPN server based at least in part on transmitting the query, that the first exit IP address is blocked by the host device. For instance, the VPN server may utilize the associated memory and/or processor to determine, based at least in part on transmitting the query, that the first exit IP address is blocked by the host device, as discussed elsewhere herein.

As shown by reference numeral 340, process 300 includes transmitting, by the VPN server during the established VPN connection and based at least in part on determining that the first exit IP address is blocked, the data request to a secondary server to enable retransmission of the query to the host device by utilizing a second exit IP address, different from the first exit IP address. For instance, the VPN server may utilize the associated communication interface, memory, and/or processor to transmit, during the established VPN connection and based at least in part on determining that the first exit IP address is blocked, the data request to a secondary server to enable retransmission of the query to the host device by utilizing a second exit IP address, different from the first exit IP address, as discussed elsewhere herein.

Process 300 may include additional aspects, such as any single aspect or any combination of aspects described below and/or in connection with one or more other processes described elsewhere herein.

In a first aspect, process 300 may include establishing, by the VPN server based at least in part on determining that the first exit IP address is blocked, a secure connection between the VPN server and the secondary server.

In a second aspect, alone or in combination with the first aspect, process 300 may include modifying, by the VPN server based at least in part on determining that the first exit IP address is blocked, a configuration of an associated domain name system (DNS) server such that the DNS server returns communication information associated with the secondary server when information is to be retrieved from the host device.

In a third aspect, alone or in combination with the first through second aspects, process 300 may include transmitting, by the VPN server to the secondary server based at least in part on determining that the first exit IP address is blocked, communication information associated with the host device to enable retransmission of the query to the host device.

In a fourth aspect, alone or in combination with the first through third aspects, process 300 may include receiving, by the VPN server from the secondary server during the established VPN connection, the data of interest retrieved from the host device based at least in part on utilization of the second exit IP address; and transmitting, by the VPN server during the established VPN connection, the data of interest to the user device.

In a fifth aspect, alone or in combination with the first through fourth aspects, process 300 may include suspending, by the VPN server based at least in part on determining that the first exit IP address is blocked by the host device, utilization of the first exit IP address for retrieving information from the host device.

In a sixth aspect, alone or in combination with the first through fifth aspects, process 300 may include transmitting, by the VPN server, a query to the host device during a suspension of the first exit IP address to determine whether the first exit IP address is currently blocked by the host device.

Although FIG. 3 shows example blocks of the process, in some aspects, the process may include additional blocks, fewer blocks, different blocks, or differently arranged blocks than those depicted in FIG. 3. Additionally, or alternatively, two or more of the blocks of the process may be performed in parallel.

As indicated above, FIG. 3 is provided as an example. Other examples may differ from what is described with regard to FIG. 3.

FIG. 4 is an illustration of an example process 400 associated with utilization of multiple exit IP addresses in a VPN environment, according to various aspects of the present disclosure. In some aspects, the process 400 may be performed by an associated memory (e.g., memory 730) and/or an associated processor (e.g., processor 720) related to a VPN server (e.g., VPN server 120) configured by an associated VSP control infrastructure. As shown by reference numeral 410, process 400 receiving, at a VPN server from a user device during an established VPN connection between the VPN server and the user device, a data request for the VPN server to retrieve data of interest from a host device. For instance, the VPN server may utilize an associated communication interface (e.g., communication interface 770) with the associated memory and/or processor to receive, from a user device during an established VPN connection between the VPN server and the user device, a data request for the VPN server to retrieve data of interest from a host device, as discussed elsewhere herein.

As shown by reference numeral 420, process 400 includes transmitting, by the VPN server to the host device during the established VPN connection, a query to retrieve the data of interest based at least in part on utilizing a first exit IP address. For instance, the VPN server may utilize the associated communication interface, memory, and processor to transmit, to the host device during the established VPN connection, a query to retrieve the data of interest based at least in part on utilizing a first exit IP address, as discussed elsewhere herein.

As shown by reference numeral 430, process 400 includes determining, by the VPN server during the established VPN connection and based at least in part on transmitting the query, that the first exit IP address is blocked by the host device. For instance, the VPN server may utilize the associated memory and processor to determine, during the established VPN connection and based at least in part on transmitting the query, that the first exit IP address is blocked by the host device, as discussed elsewhere herein.

As shown by reference numeral 440, process 400 includes retrieving, by the VPN server during the established VPN connection and based at least in part on determining that the first exit IP address is blocked by the host device, the data of interest based at least in part on utilizing a second exit IP address, different from the first exit IP address. For instance, the VPN server may utilize the associated communication interface, memory, and processor to retrieve, during the established VPN connection and based at least in part on determining that the first exit IP address is blocked by the host device, the data of interest based at least in part on utilizing a second exit IP address, different from the first exit IP address, as discussed elsewhere herein.

As shown by reference numeral 440, process 400 includes transmitting, by the VPN server to the user device during the established VPN connection, the data of interest that is retrieved based at least in part on utilizing the second exit IP address. For instance, the VPN server may utilize the associated communication interface, memory, and processor to transmit, to the user device during the established VPN connection, the data of interest that is retrieved based at least in part on utilizing the second exit IP address, as discussed elsewhere herein.

Process 400 may include additional aspects, such as any single aspect or any combination of aspects described below and/or in connection with one or more other processes described elsewhere herein.

In a first aspect, wherein, process 400 may include determining, by the VPN server, that the first exit IP address is blocked by the host device based at least in part on the host device declining to provide the data of interest.

In a second aspect, alone or in combination with the first aspect, process 400 may include determining, by the VPN server, that the first exit IP address is blocked by the host device based at least in part on determining that the query transmitted by utilizing the first exit IP address is discarded by the host device.

In a third aspect, alone or in combination with the first through second aspects, process 400 may include automatically suspending, by the VPN server, utilization of the first exit IP address to retrieve information from the host device based at least in part on determining that the first exit IP address is blocked by the host device.

In a fourth aspect, alone or in combination with the first through third aspects, process 400 may include transmitting, during the established VPN connection by the VPN server based at least in part on receiving another data request for the VPN server to retrieve other data of interest from another host device, another query to retrieve the other data of interest from the other host device based at least in part on utilizing the first exit IP address.

In a fifth aspect, alone or in combination with the first through fourth aspects, process 400 includes updating, by the VPN server based at least in part on retrieving the data of interest by utilizing the second exit IP address, a local connection tracking table to include a positive correlation between the second exit IP address and the host device to indicate that the second exit IP address is available for retrieving information from the host device.

In a sixth aspect, alone or in combination with the first through fifth aspects, process 400 may include modifying, by the VPN server based at least in part on determining that the first exit IP address is blocked, a configuration of an associated domain name system (DNS) server such that the DNS server returns communication information associated with the secondary server when information is to be retrieved from the host device.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with utilization of multiple exit IP addresses in a VPN environment, according to various aspects of the present disclosure. In some aspects, the process 500 may be performed by an associated memory (e.g., memory 730) and/or an associated processor (e.g., processing unit 110, processor 720) related to a VSP control infrastructure configured to configure an associated VPN server (e.g., VPN server 120). As shown by reference numeral 510, process 500 includes configuring a VPN server to receive, from a user device during an established VPN connection between the VPN server and the user device, a data request for the VPN server to retrieve data of interest from a host device. For instance, the VSP control infrastructure may utilize the associated memory and/or processor to configure a VPN server to receive, from a user device during an established VPN connection between the VPN server and the user device, a data request for the VPN server to retrieve data of interest from a host device, as discussed elsewhere herein.

As shown by reference numeral 520, process 500 includes configuring the VPN server to utilize, during the established VPN connection, a first exit internet protocol (IP) address to transmit a query to the host device for retrieving the data of interest. For instance, the VSP control infrastructure may utilize the associated memory and/or processor to configure the VPN server to utilize, during the established VPN connection, a first exit internet protocol (IP) address to transmit a query to the host device for retrieving the data of interest, as discussed elsewhere herein.

As shown by reference numeral 530, process 500 includes configuring the VPN server to determine, based at least in part on transmitting the query, that the first exit IP address is blocked by the host device. For instance, the VSP control infrastructure may utilize the associated memory and/or processor to configure the VPN server to determine, based at least in part on transmitting the query, that the first exit IP address is blocked by the host device, as discussed elsewhere herein.

As shown by reference numeral 540, process 500 includes configuring the VPN server to transmit, during the established VPN connection and based at least in part on determining that the first exit IP address is blocked, the data request to a secondary server to enable retransmission of the query to the host device by utilizing a second exit IP address, different from the first exit IP address. For instance, the VSP control infrastructure may utilize the associated memory and/or processor to configure the VPN server to transmit, during the established VPN connection and based at least in part on determining that the first exit IP address is blocked, the data request to a secondary server to enable retransmission of the query to the host device by utilizing a second exit IP address, different from the first exit IP address, as discussed elsewhere herein.

Process 500 may include additional aspects, such as any single aspect or any combination of aspects described below and/or in connection with one or more other processes described elsewhere herein.

In a first aspect, wherein, in process 500, configuring a VPN server to establish, based at least in part on determining that the first exit IP address is blocked, a secure connection between the VPN server and the secondary server.

In a second aspect, alone or in combination with the first aspect, process 500 may include configuring a VPN server to modify, based at least in part on determining that the first exit IP address is blocked, a configuration of an associated domain name system (DNS) server such that the DNS server returns communication information associated with the secondary server when information is to be retrieved from the host device.

In a third aspect, alone or in combination with the first through second aspects, process 500 may include configuring a VPN server to transmit, to the secondary server based at least in part on determining that the first exit IP address is blocked, communication information associated with the host device to enable retransmission of the query to the host device.

In a fourth aspect, alone or in combination with the first through third aspects, process 500 may include configuring a VPN server to receive, from the secondary server during the established VPN connection, the data of interest retrieved from the host device based at least in part on utilization of the second exit IP address; and configuring a VPN server to transmit, during the established VPN connection, the data of interest to the user device.

In a fifth aspect, alone or in combination with the first through fourth aspects, process 500 may include configuring a VPN server to suspend, based at least in part on determining that the first exit IP address is blocked by the host device, utilization of the first exit IP address for retrieving information from the host device.

In a sixth aspect, alone or in combination with the first through fifth aspects, process 500 may include configuring a VPN server to transmit a query to the host device during a suspension of the first exit IP address to determine whether the first exit IP address is currently blocked by the host device.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of an example process 600 associated with utilization of multiple exit IP addresses in a VPN environment, according to various aspects of the present disclosure. In some aspects, the process 600 may be performed by an associated memory (e.g., memory 730) and/or an associated processor (e.g., processing unit 110, processor 720) related to a VSP control infrastructure configured to configure an associated VPN server (e.g., VPN server 120). As shown by reference numeral 610, process 600 includes configuring a VPN server to receive, from a user device during an established VPN connection between the VPN server and the user device, a data request for the VPN server to retrieve data of interest from a host device. For instance, the VSP control infrastructure may utilize the associated memory and/or processor to configure a VPN server to receive, from a user device during an established VPN connection between the VPN server and the user device, a data request for the VPN server to retrieve data of interest from a host device, as discussed elsewhere herein.

As shown by reference numeral 620, process 600 includes configuring the VPN server to transmit, to the host device during the established VPN connection, a query to retrieve the data of interest based at least in part on utilizing a first exit IP address. For instance, the VSP control infrastructure may utilize the associated memory and/or processor to configure the VPN server to transmit, to the host device during the established VPN connection, a query to retrieve the data of interest based at least in part on utilizing a first exit IP address, as discussed elsewhere herein.

As shown by reference numeral 630, process 600 includes configuring the VPN server to determine, during the established VPN connection and based at least in part on transmitting the query, that the first exit IP address is blocked by the host device. For instance, the VSP control infrastructure may utilize the associated memory and/or processor to configure the VPN server to determine, during the established VPN connection and based at least in part on transmitting the query, that the first exit IP address is blocked by the host device, as discussed elsewhere herein.

As shown by reference numeral 640, process 600 includes configuring the VPN server to retrieve, during the established VPN connection and based at least in part on determining that the first exit IP address is blocked by the host device, the data of interest based at least in part on utilizing a second exit IP address, different from the first exit IP address. For instance, the VSP control infrastructure may utilize the associated memory and/or processor to configure the VPN server to retrieve, during the established VPN connection and based at least in part on determining that the first exit IP address is blocked by the host device, the data of interest based at least in part on utilizing a second exit IP address, different from the first exit IP address, as discussed elsewhere herein.

As shown by reference numeral 650, process 600 includes configuring the VPN server to transmit, to the user device during the established VPN connection, the data of interest that is retrieved based at least in part on utilizing the second exit IP address. For instance, the VSP control infrastructure may utilize the associated memory and/or processor to configure the VPN server to transmit, to the user device during the established VPN connection, the data of interest that is retrieved based at least in part on utilizing the second exit IP address, as discussed elsewhere herein.

Process 600 may include additional aspects, such as any single aspect or any combination of aspects described below and/or in connection with one or more other processes described elsewhere herein.

In a first aspect, wherein, process 600 may include configuring the VPN server to determine that the first exit IP address is blocked by the host device based at least in part on the host device declining to provide the data of interest.

In a second aspect, alone or in combination with the first aspect, process 600 may include configuring the VPN server to determine that the first exit IP address is blocked by the host device based at least in part on determining that the query transmitted by utilizing the first exit IP address is discarded by the host device.

In a third aspect, alone or in combination with the first through second aspects, process 600 may include configuring the VPN server to automatically suspend utilization of the first exit IP address to retrieve information from the host device based at least in part on determining that the first exit IP address is blocked by the host device.

In a fourth aspect, alone or in combination with the first through third aspects, process 600 may include configuring the VPN server to transmit, during the established VPN connection and based at least in part on receiving another data request for the VPN server to retrieve other data of interest from another host device, another query to retrieve the other data of interest from the other host device based at least in part on utilizing the first exit IP address.

In a fifth aspect, alone or in combination with the first through fourth aspects, process 600 may include configuring the VPN server to update, based at least in part on retrieving the data of interest by utilizing the second exit IP address, a local connection tracking table to include a positive correlation between the second exit IP address and the host device to indicate that the second exit IP address is available for retrieving information from the host device.

In a sixth aspect, alone or in combination with the first through fifth aspects, process 600 may include configuring the VPN server to modify, based at least in part on determining that the first exit IP address is blocked, a configuration of an associated domain name system (DNS) server such that the DNS server returns communication information associated with the secondary server when information is to be retrieved from the host device.

Although FIG. 6 shows example blocks of the process, in some aspects, the process may include additional blocks, fewer blocks, different blocks, or differently arranged blocks than those depicted in FIG. 6. Additionally, or alternatively, two or more of the blocks of the process may be performed in parallel.

As indicated above, FIG. 6 is provided as an example. Other examples may differ from what is described with regard to FIG. 6.

FIG. 7 is an illustration of example devices 700, according to various aspects of the present disclosure. In some aspects, the example devices 700 may form part of or implement the systems, environments, infrastructures, components, devices or the like described elsewhere herein (e.g., VPN server, the VSP control infrastructure, etc.) and may be utilized for performing the example processes described elsewhere herein. The example devices 700 may include a universal bus 710 communicatively coupling a processor 720, a memory 730, a storage component 740, an input component 750, an output component 760, and a communication interface 770.

Bus 710 may include a component that permits communication among multiple components of a device 700. Processor 720 may be implemented in hardware, firmware, and/or a combination of hardware and software. Processor 720 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 720 may include one or more processors capable of being programmed to perform a function. Memory 730 may include a random access memory (RAM), a read only memory (ROM), and/or another type of dynamic or static storage device (e.g., a flash memory, a magnetic memory, and/or an optical memory) that stores information and/or instructions for use by processor 720.

Storage component 740 may store information and/or software related to the operation and use of a device 700. For example, storage component 740 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 750 may include a component that permits a device 700 to receive information, such as via user input (e.g., a touch screen display, a keyboard, a keypad, a mouse, a button, a switch, and/or a microphone). Additionally, or alternatively, input component 750 may include a component for determining location (e.g., a global positioning system (GPS) component) and/or a sensor (e.g., an accelerometer, a gyroscope, an actuator, another type of positional or environmental sensor, and/or the like). Output component 760 may include a component that provides output information from device 700 (via, for example, a display, a speaker, a haptic feedback component, an audio or visual indicator, and/or the like).

Communication interface 770 may include a transceiver-like component (e.g., a transceiver, a separate receiver, a separate transmitter, and/or the like) that enables a device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, and/or the like.

A device 700 may perform one or more processes described elsewhere herein. A device 700 may perform these processes based on processor 720 executing software instructions stored by a non-transitory computer-readable medium, such as memory 730 and/or storage component 740. As used herein, the term "computer-readable medium" may refer to a non-transitory memory device. A memory device may include memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 7 are provided as an example. In practice, a device 700 may include additional components, fewer components, different components, or differently arranged components than those shown in FIG. 7. Additionally, or alternatively, a set of components (e.g., one or more components) of a device 700 may perform one or more functions described as being performed by another set of components of a device 700.

As indicated above, FIG. 7 is provided as an example. Other examples may differ from what is described with regard to FIG. 7.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The claims are as follows:

1. A virtual private network (VPN) server, comprising:
   a memory; and
   a processor communicatively coupled to the memory, the memory and the processor being configured to:
   receive, from a user device during an established VPN connection between the VPN server and the user device, a data request for the VPN server to retrieve data of interest from a host device;
   utilize, during the established VPN connection, a first exit internet protocol (IP) address to transmit a query to the host device for retrieving the data of interest;
   determine, based at least in part on transmitting the query, that the first exit IP address is blocked by the host device; and
   transmit, during the established VPN connection and based at least in part on determining that the first exit IP address is blocked, the data request to a secondary server to enable retransmission of the query to the host device by utilizing a second exit IP address, different from the first exit IP address.

2. The VPN server of claim 1, wherein the memory and the processor are configured to:
   establish, based at least in part on determining that the first exit IP address is blocked, a secure connection between the VPN server and the secondary server.

3. The VPN server of claim 1, wherein the memory and the processor are configured to:
   modify, based at least in part on determining that the first exit IP address is blocked, a configuration of an associated domain name system (DNS) server such that the DNS server returns communication information associated with the secondary server when information is to be retrieved from the host device.

4. The VPN server of claim 1, wherein the memory and the processor are configured to:
   transmit, to the secondary server based at least in part on determining that the first exit IP address is blocked, communication information associated with the host device to enable retransmission of the query to the host device.

5. The VPN server of claim 1, wherein the memory and the processor are configured to:
   receive, from the secondary server during the established VPN connection, the data of interest retrieved from the host device based at least in part on utilization of the second exit IP address; and
   transmit, during the established VPN connection, the data of interest to the user device.

6. The VPN server of claim 1, wherein the memory and the processor are configured to:
   suspend, based at least in part on determining that the first exit IP address is blocked by the host device, utilization of the first exit IP address for retrieving information from the host device.

7. The VPN server of claim 1, wherein the memory and the processor are configured to:
   transmit, a query to the host device during a suspension of the first exit IP address to determine whether the first exit IP address is currently blocked by the host device.

8. A method in a virtual private network (VPN), the method comprising:
   receiving, at a VPN server from a user device during an established VPN connection between the VPN server and the user device, a data request for the VPN server to retrieve data of interest from a host device;
   utilizing, by the VPN server during the established VPN connection, a first exit internet protocol (IP) address to transmit a query to the host device for retrieving the data of interest;
   determining, by the VPN server based at least in part on transmitting the query, that the first exit IP address is blocked by the host device; and
   transmitting, by the VPN server during the established VPN connection and based at least in part on determining that the first exit IP address is blocked, the data request to a secondary server to enable retransmission of the query to the host device by utilizing a second exit IP address, different from the first exit IP address.

9. The method of claim 8, further comprising:
   establishing, by the VPN server based at least in part on determining that the first exit IP address is blocked, a secure connection between the VPN server and the secondary server.

10. The method of claim 8, further comprising:
    modifying, by the VPN server based at least in part on determining that the first exit IP address is blocked, a configuration of an associated domain name system (DNS) server such that the DNS server returns communication information associated with the secondary server when information is to be retrieved from the host device.

11. The method of claim 8, further comprising:
    transmitting, by the VPN server to the secondary server based at least in part on determining that the first exit IP address is blocked, communication information associated with the host device to enable retransmission of the query to the host device.

12. The method of claim 8, further comprising:
    receiving, by the VPN server from the secondary server during the established VPN connection, the data of interest retrieved from the host device based at least in part on utilization of the second exit IP address; and
    transmitting, by the VPN server during the established VPN connection, the data of interest to the user device.

13. The method of claim 8, further comprising:
    suspending, by the VPN server based at least in part on determining that the first exit IP address is blocked by the host device, utilization of the first exit IP address for retrieving information from the host device.

14. The method of claim 8, further comprising:
    transmitting, by the VPN server, a query to the host device during a suspension of the first exit IP address to determine whether the first exit IP address is currently blocked by the host device.

15. A non-transitory computer-readable medium configured to store instructions, which when executed by a processor associated with a virtual private network (VPN) server, configure the processor to:
    receive, from a user device during an established VPN connection between the VPN server and the user device, a data request for the VPN server to retrieve data of interest from a host device;
    utilize, during the established VPN connection, a first exit internet protocol (IP) address to transmit a query to the host device for retrieving the data of interest;
    determine, based at least in part on transmitting the query, that the first exit IP address is blocked by the host device; and
    transmit, during the established VPN connection and based at least in part on determining that the first exit IP address is blocked, the data request to a secondary server to enable retransmission of the query to the host device by utilizing a second exit IP address, different from the first exit IP address.

16. The non-transitory computer-readable medium of claim 15, wherein the processor is configured to:
establish, based at least in part on determining that the first exit IP address is blocked, a secure connection between the VPN server and the secondary server.

17. The non-transitory computer-readable medium of claim 15, wherein the processor is configured to:
modify, based at least in part on determining that the first exit IP address is blocked, a configuration of an associated domain name system (DNS) server such that the DNS server returns communication information associated with the secondary server when information is to be retrieved from the host device.

18. The non-transitory computer-readable medium of claim 15, wherein the processor is configured to:
transmit, to the secondary server based at least in part on determining that the first exit IP address is blocked, communication information associated with the host device to enable retransmission of the query to the host device.

19. The non-transitory computer-readable medium of claim 15, wherein the processor is configured to:
receive, from the secondary server during the established VPN connection, the data of interest retrieved from the host device based at least in part on utilization of the second exit IP address; and
transmit, during the established VPN connection, the data of interest to the user device.

20. The non-transitory computer-readable medium of claim 15, wherein the processor is configured to:
suspend, based at least in part on determining that the first exit IP address is blocked by the host device, utilization of the first exit IP address for retrieving information from the host device.

* * * * *